Patented June 20, 1933

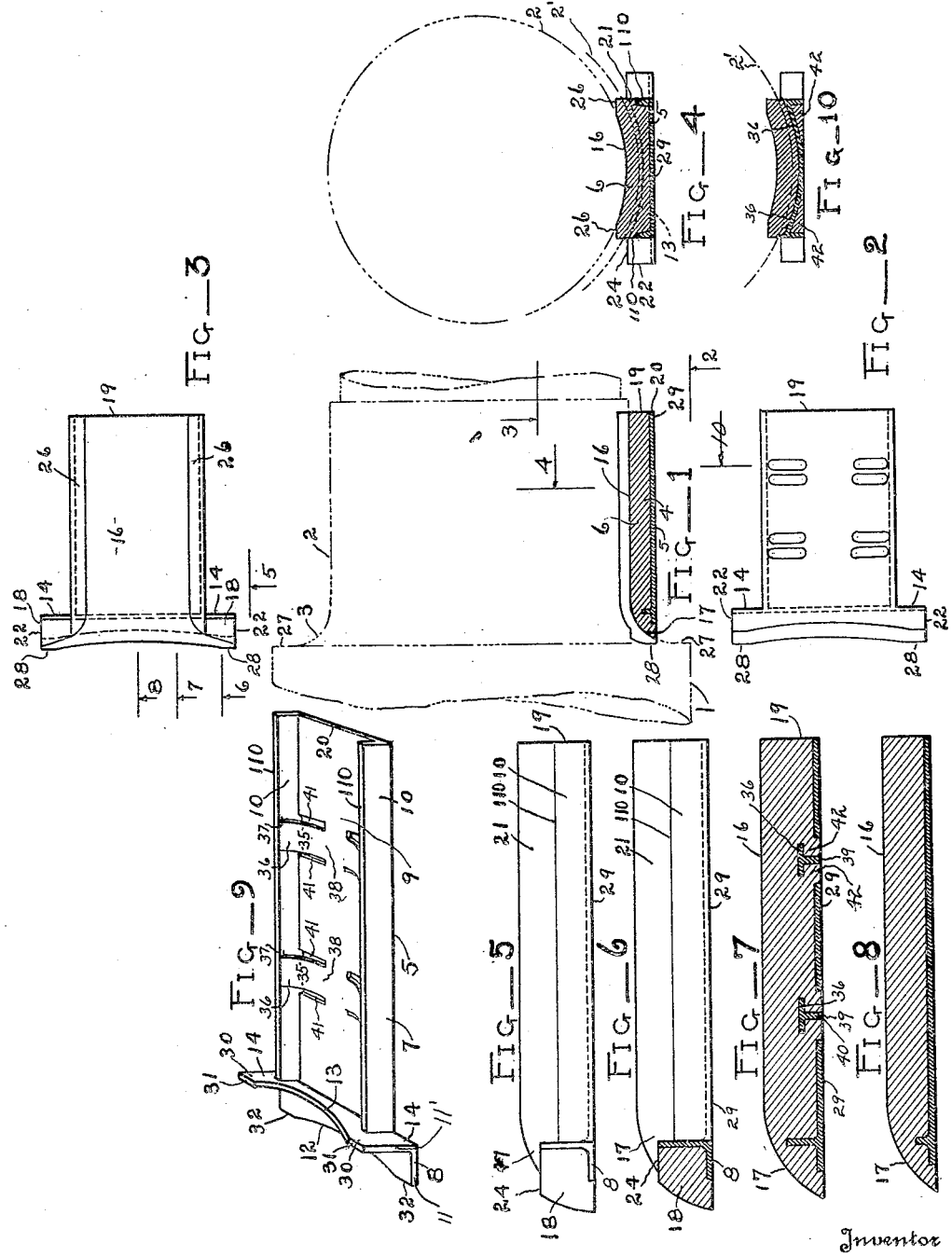

1,914,581

UNITED STATES PATENT OFFICE

ALLAN C. RYAN, OF LAKEWOOD, OHIO; GENEVIEVE RYAN ADMINISTRATRIX OF SAID ALLAN C. RYAN, DECEASED

REENFORCED BEARING BRASS

Application filed July 17, 1930. Serial No. 468,497.

This invention relates to bearings and particularly to liners for rotary bearings.

In some types of installations it is customary to line rotary bearings with brass, bronze or other suitable bearing material. In cases where the load on the bearing is great such as obtains for example in the bearings supporting mill rolls, the lining material is subject to breakage. Breakage can, of course, be obviated by providing bearing liners of massive cross-section, but in some cases, for example in the case of mill rolls, it is desirable to continuously "take up" the wear on the bearing liners by adjustment of the liners and in the course of time the liner wears away sufficiently to weaken it and it then may break. The breakage of the bearing liners during operation of the machinery rotatably supported thereon may result in damage to the machine or work and in other losses.

It is one of the objects of this invention to provide a bearing liner or "bearing brass" as it is sometimes known in the art, reenforced in an improved manner with iron or other stronger metal to prevent breaking thereof.

Another object is to provide a reenforced bearing liner in which the reenforcement is so formed as to support the bearing against breakage but to also permit wearing away of the liner material in use without exposing the reenforcement elements to contact with the shaft or the like rotating on the liner.

Another object is to provide a reenforcing frame of improved construction in which the liner material may be integrally molded to form a unit liner.

Another object is to provide a combined liner and reenforcing frame therefor adaptable to support the neck or bearing portion of a mill roll or the like.

Another object is to provide a reenforced bearing liner whereof the reenforcement and the bearing liner material may be integrally formed into a unit and the reenforcement interlocked with the liner material in an improved manner.

Another object is to provide, for bearing liners, a supporting frame, box or other reenforcement which may be advantageously fabricated from cast metal and interlocked with the bearing liner material.

Another object is to provide a reenforced bearing liner the reenforcing elements of which may also be employed to position and secure the liner in the bearing housing or liner support.

Other objects will be apparent to those skilled in the art to which my invention appertains.

My invention is fully disclosed in the following description taken in connection with the accompanying drawing, in which:—

Fig. 1 is a view indicating in broken lines and in front elevation the neck end of a mill roll and showing in longitudinal cross-section a bearing liner embodying my invention;

Fig. 2 is a view of the liner of Fig. 1 taken approximately from the plane 2 of Fig. 1;

Fig. 3 is a view of the liner of Fig. 1 taken approximately from the plane 3 of Fig. 1;

Fig. 4 is a sectional view taken approximately from the plane 4 of Fig. 1, indicating in broken lines the neck of the mill roll of Fig. 1 and illustrating the manner of wearing away of the bearing liner;

Fig. 5 is a side elevational view taken from the plane 5 of Fig. 3;

Fig. 6 is a sectional view taken from the plane 6 of Fig. 3;

Fig. 7 is a sectional view taken approximately from the plane 7 of Fig. 3;

Fig. 8 is a medial longitudinal sectional view taken from the plane 8 of Fig. 3;

Fig. 9 is a perspective view of reenforcing frame which I may employ in the liner construction of my invention.

Fig. 10 is a view similar to Fig. 4 taken approximately from the plane 10 of Figs. 1 and 2.

The bearing liner of my invention is applicable to many uses but I have chosen to describe it herein as part of the supporting bearing for the end or ends of a rolling mill roll. At 1 is indicated one end of a mill roll and at 2 the neck by which the roll is adapted to be rotatably supported. At 3 is indicated a fillet of large radius to strengthen the juncture of the roll and neck. In some cases, the fillet 3 may not extend entirely to the cylindrical portion 1 of the roll thus leaving a transverse shoulder 27 on the roll at the outer transverse termination of the fillet 3. The pedestal or bearing housing is omitted from the drawing for simplicity, and it may have any suitable or well known construction. Such bearing housings are, as is well known, formed to support therewithin one or more bearing liners of brass, bronze or other suitable bearing material.

In Fig. 1, I have indicated generally at 4 the bearing liner embodying my invention and which supports the roll 1 rotatably and laterally and against endwise movement and supports the weight of the roll 1 and the load on the roll in use.

The bearing liner comprises a frame or base or reenforcement 5 and a mass or block of bearing material proper 6. The frame 5 illustrated separately in Fig. 9 is preferably formed from cast metal such as cast iron and may be considered as comprising a longitudinally disposed channel portion 7, generally U-shape in transverse cross-section and a transversely disposed angle portion 8, generally V-shape in cross-section. The channel portion 7 comprises a web 9 and side flanges 10—10.

The angle portion 8 comprises angle legs 11 and 11' and is disposed transversely of the channel portion 7 with one end of the channel portion, in effect, abutted against the vertical disposed leg 11' of the angle portion. The other leg 11 of the angle portion and the web 9 are thus disposed in a common plane or floor 29. The angle portion 8 is longer than the width of the channel portion 7 and the ends of the angle portion project laterally beyond the flanges 10 of the channel portion as shown at 14—14. The leg 11', of the angle portion extends above the edges of the channel flanges 10—10 as at 30—30. The edges of the legs 11 and 11' of the angle portion 8 are cut away on portions intermediate the ends of the angle portion to provide curved edges 12 and 13 thereon respectively. The curved edges 12 and 13 terminate short of the ends of the angle legs thus leaving uncut edge portions 32 and 31 respectively.

The channel flanges 10—10 are braced with the channel web 9 by a plurality of generally diagonal braces 35—35 which braces serve not only to strengthen the channel portion 7 but in a manner to be described are adapted to dove-tail or interlock or key the liner material proper, to be more fully referred to, in the base or reenforcement 5 to rigidly secure the base and the liner material together integrally and to effectively form therefrom a structurally unitary bearing liner.

The braces 35 are T-shape in cross-sectional planes longitudinally of the channel portion 7 as best shown in Fig. 7, the braces 35 comprising inwardly concave head portions 36, joining the channel flanges 10 at portions 37 adjacent the flange edges with the web 9 of the channel portion at portions 38 adjacent the medial line of the web, the head portions 36 merging tangentially into the web portion 9. The braces 35 comprise also rib portions 39 disposed below the head portions 36 and joining the head portions 36 with the channel flange 10. The lower edges of the ribs 39 are, as at 40, in the bottom plane 29 of the channel portion 7. The head portions 36 of the braces 35 thus overhang the rib portions 39.

To facilitate forming the box or reenforcement as a whole from cast metal, the channel web 9 is cut away as at 41—41 providing apertures in the web 9 under the overhanging portions of the brace heads 36 of greater extent longitudinally of the channel portion than the head portions 36 of the braces. By this construction, which will be understood by those skilled in this art, separate molding cores are not necessary, and the over-hanging braces 35 may be molded integrally with the web 9 and flanges 10 of the channel portion from green sand only.

The frame or base 5 thus constructed has molded therein and thereon brass, bronze or other bearing material 6, the mold for the latter being formed so that the upper surface indicated in the various figures at 16 conforms to the bearing surface of the neck 2 of the roll. A portion of the said surface therefor is cylindrical to conform to the cylindrical portion 2 of the neck, this portion being approximately longitudinally co-extensive with the channel portion of the base; and the remainder of the surface of the bearing material 6 is disposed approximately over the angle portion 8 and conforms to the fillet 3 and shoulder 27 of the roll, as shown at 17 and 28 respectively. The mold is furthermore so formed that the bearing material fills the extensions of the angle portion extending laterally from the channel thus providing oppositely extending lugs or ears 18—18.

The bearing material during the molding thereof, flows under the head portions 36 of the braces 35 as at 42—42 and is thus interlocked or keyed therewith and is permanently and rigidly interlocked with the reenforcement 5 as a whole.

Either by suitably forming the mold or by working the bearing material after molding, the bearing material is disposed as follows. At the rear end of the liner as at 19 the bearing material is flush with the end 20 of the channel 9. At the sides of the liner, the bearing material as at 21 is flush with the outer surface of the channel flanges 10—10 and the bearing material as at 21, Fig. 4, overlies the edges 11, Figs. 4, 5 and 6 of the channel for a considerable thickness to provide for wearing away of the material to be referred to later. The lateral ends of the lugs 18 are flush with the ends of the angle portion 8, as shown at 22, Figs. 2, 3 and 4 and the tops of the lugs are substantially planular in the plane of the upper uncut edge 31 of the vertical leg 11' of the angle portion 8, as shown at 24, Figs. 4, 5 and 6. At the forward end of the liner, and on the bottom thereof, the bearing material is in the bottom plane 29 of the frame or base, as shown at 25, Figs. 5 to 8 inclusive. As shown in Figs. 3 and 4, adjacent the sides of the liner, the liner material is formed with flat marginal portions 26—26 parallel to the base 29.

As illustrated in Fig. 4, the bearing material 6 will be worn away in service by the neck 2, the neck ultimately taking up the position indicated at 2'. The thickness or depth of the bearing material in the channel portion 7 is predetermined to permit a predetermined amount of wear such as that indicated in Fig. 4 and so that at the end of said wear, the neck as at 2' will still be spaced from the edges 110 of the channel portion as illustrated in Fig. 4. Similarly, the bearing material 6 will be worn away by the fillet portion 3 of the neck and at the contact between the shoulder 27 of the roll. In order that an amount of wear at the portion 17 of the liner and the portions 28—28 thereof in contact with the fillet 3 and shoulder 27 may wear correspondingly with the wear on the cylindrical portion above described, the concave edge 13 and the concave edge 12 and uncut portions 32 of the angle portion 8 of the frame are shaped and proportioned to clear the said fillet 3 and shoulder 27 by suitable amounts at all points.

As shown in Fig. 4, the concave edge 13 of the angle portion 8 is curved to clear the roll neck 2 by a predetermined amount at the end of a predetermined amount of wear as shown in Fig. 4 by the space between the edge 13 and the neck in its final position, 2', at the end of the wear.

Similarly, the heads 36 of the braces 35, as shown in Fig. 10 may be curved and positioned so that at the end of the predetermined amount of wear, the neck in the position indicated at 2' may clear the heads 36 by a suitable predetermined amount.

It will now be apparent that the bearing liner material 6 is backed up or faced with a wear-resisting rigid base or supporting face comprising the web 9 of the channel portion and the leg 11 of the angle portion 8 upon which the liner as a unit may be rigidly supported and in a stable manner. Furthermore, the flanges 10—10 of the channel portion 7 and the extensions 14 of the angle portion 8 as well as the end 20 of the channel portion provide hard wear-resisting faces by means of which the liner as a whole may be positioned in the supporting pedestal and be retained in position against the load, rotational, side and end thrust reactions of the roll. And the flanges 10 of the channel portion and the vertical leg 11' of the angle portion are disposed to serve the additional function of reenforcing the relatively weak bearing material against breaking. Furthermore, the disposition of the parts of the frame effect the foregoing results and at the same time allow for wearing of the bearing material until the latter is much thinner than would be possible without causing the supporting frame or base to come into frictional contact with the bearing portions of the roll.

I have illustrated only a single bearing liner 4 on the under side and the lower of a pair of rolls. It will of course be understood that a similar liner may be employed on the upper side of the upper of the pair of the rolls and, if desired also, other similar bearing liners may be provided on lateral portions of either or both of the necks of the two rolls.

My invention is not limited to the exact details of construction shown and described. Many changes therein and modifications thereof may be made within the spirit of my invention without sacrificing its advantages.

I claim:

1. In a supporting frame for bearing liners, a channel portion comprising a web and side flanges, an angle portion comprising a pair of angularly disposed flanges, one of the flanges of the angle portion being disposed in the plane of the web of the channel portion and extending away from the channel portion and the other flange of the angle portion being disposed transversely across the end terminations of the channel web and side flanges and joined thereto.

2. In a supporting frame for bearing liners, a channel portion comprising a web and side flanges, an angle portion comprising a pair of angularly disposed flanges, one of the flanges of the angle portion being disposed in the plane of the web of the channel portion and extending away from the channel portion and the other flange of the angle portion being disposed transversely across the end terminations of the channel web and flanges and joined thereto, and the ends of the angle portion extending laterally beyond the side flanges of the channel portion.

3. In a supporting frame for bearing liners, a channel portion comprising a web and side flanges, an angle portion comprising a pair of angularly disposed flanges, one of the flanges of the angle portion being disposed in the plane of the web of the channel portion and the other flange of the angle portion being disposed transversely across the end terminations of the channel portion, and a brace between the channel web and a side flange thereof provided with a portion over-hanging the plane of the web.

4. In a supporting frame for bearing liners, a channel portion comprising a web and side flanges, an angle portion comprising a pair of angularly disposed flanges, one of the flanges of the angle portion being disposed in the plane of the web of the channel portion and extending away from the end of the channel and the other flange of the angle portion being disposed transversely across the end terminations of the channel web and flanges and joined thereto, and the edge thereof being formed outwardly concave.

5. In a supporting frame for bearing liners, a channel portion comprising a web and side flanges, an angle portion comprising a pair of angularly disposed flanges, one of the flanges of the angle portion being disposed substantially in the plane of the web of the channel portion and extending away from the end of the channel and having an outwardly concave edge and the other flange of the angle portion being disposed transversely across the end terminations of the channel web and flanges and joined thereto and having an outwardy concave edge.

6. In a supporting frame for bearing liners, a channel portion comprising a web and side flanges, an angle portion comprising a pair of angularly disposed flanges, one of the flanges of the angle portion being disposed substantially in the plane of the web of the channel portion and having an outwardly concave edge and the other flange of the angle portion being disposed transversely across the end terminations of the channel portion and having an outwardly concave edge, and a brace between the web and a flange of the channel portion formed outwardly concave and having a portion overhanging the plane of said web.

7. In a supporting frame for bearing liners, a channel portion comprising a web and side flanges, an angle portion comprising a pair of angularly disposed flanges, one of the flanges of the angle portion being disposed substantially in the plane of the web of the channel portion and having an outwardly concave edge and the other flange of the angle portion being disposed transversely across the end terminations of the channel portion and having an outwardly concave edge, and a brace between the web and a flange of the channel portion formed outwardly concave and having a portion over-hanging the plane of said web, and the ends of the angle portion extending beyond the side flanges of the channel portion.

8. A supporting frame for bearing liners comprising a portion of channel cross-section and a portion of angle cross-section, an end of the channel portion abutting upon one leg of the angle portion and the other leg extending away from the end of the channel portion.

9. A supporting frame for bearing liners comprising a longitudinally elongated channel portion and a longitudinally elongated portion of angle cross-section, an end of the channel portion abutting upon one leg of the angle portion and the other leg extending away from the end of the channel portion.

In testimony whereof I hereunto affix my signature this 9th day of July, 1930.

ALLAN C. RYAN.